US009129225B2

(12) United States Patent
Sathish

(10) Patent No.: US 9,129,225 B2
(45) Date of Patent: Sep. 8, 2015

(54) METHOD AND APPARATUS FOR PROVIDING RULE-BASED RECOMMENDATIONS

(75) Inventor: Sailesh Kumar Sathish, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 800 days.

(21) Appl. No.: 13/115,678

(22) Filed: May 25, 2011

(65) Prior Publication Data

US 2012/0303561 A1 Nov. 29, 2012

(51) Int. Cl.

| | |
|---|---|
| ***G06F 15/18*** | (2006.01) |
| ***G06N 99/00*** | (2010.01) |
| ***G06N 3/00*** | (2006.01) |
| ***G06Q 30/02*** | (2012.01) |
| ***G06F 17/30*** | (2006.01) |

(52) U.S. Cl.

CPC ........ *G06N 99/005* (2013.01); *G06F 17/30873* (2013.01); *G06N 3/004* (2013.01); *G06Q 30/0282* (2013.01)

(58) Field of Classification Search

None

See application file for complete search history.

(56) References Cited

U.S. PATENT DOCUMENTS

| | | | | |
|---|---|---|---|---|
| 7,139,757 | B1 * | 11/2006 | Apollonsky et al. | 1/1 |
| 7,233,950 | B2 | 6/2007 | Smith, III | |
| 7,526,458 | B2 | 4/2009 | Flinn et al. | |
| 7,570,943 | B2 | 8/2009 | Sorvari et al. | |
| 7,797,722 | B2 | 9/2010 | Lin et al. | |
| 2002/0052873 | A1 * | 5/2002 | Delgado et al. | 707/7 |
| 2003/0055516 | A1 | 3/2003 | Gang et al. | |
| 2007/0022079 | A1 * | 1/2007 | Benson et al. | 706/59 |
| 2007/0112827 | A1 | 5/2007 | Dettinger et al. | |
| 2007/0143239 | A1 * | 6/2007 | Boyle et al. | 706/45 |
| 2008/0195664 | A1 | 8/2008 | Maharajh et al. | |
| 2008/0222105 | A1 | 9/2008 | Matheny | |
| 2009/0163183 | A1 | 6/2009 | O'Donoghue et al. | |
| 2009/0210378 | A1 * | 8/2009 | Benson et al. | 706/52 |
| 2010/0023469 | A1 * | 1/2010 | Farnham | 706/46 |
| 2010/0100542 | A1 | 4/2010 | Hawthorne et al. | |
| 2010/0235313 | A1 | 9/2010 | Rea et al. | |
| 2010/0312644 | A1 | 12/2010 | Borgs et al. | |
| 2011/0093815 | A1 | 4/2011 | Gobeil | |

FOREIGN PATENT DOCUMENTS

WO WO 2008/121712 A1 10/2008

OTHER PUBLICATIONS

Liiv, Innar, et al. "Personalized context-aware recommendations in SMARTMUSEUM: combining semantics with statistics." Proceedings of the 2009 Third International Conference on Advances in Semantic Processing. 2009.*

(Continued)

*Primary Examiner* — Kakali Chaki
*Assistant Examiner* — Luis Sitiriche
(74) *Attorney, Agent, or Firm* — Ditthavong & Steiner, P.C.

(57) ABSTRACT

An approach is provided for providing rule-based recommendations. The approach involves a processing of one or more user profile tags, context tags, content tags, channel tags and/or other context information. The approach further involves a determination of one or more weighting factors of one or more of the user profile tags, context tags, content tags, channel tags and other context information. The approach also involves an application of one or more rule sets that bases a determination of a recommendation on the weighting factor. The approach, then, generates one or more recommendations.

20 Claims, 9 Drawing Sheets

(56) References Cited

OTHER PUBLICATIONS

Bellotti et al., "Activity-Based Serendipitous Recommendations with the Magitti Mobile Leisure Guide", CHI 2008 Proceedings on the Move, Apr. 2008, pp. 1-10, Florence, Italy.

Office Action for related U.S. Appl. No. 12/940,775, dated Nov. 19, 2012, pp. 1-43.

Setten et al., "Context-Aware Recommendations in the Mobile Touris Application COMPASS", 2004, pp. 235-244, Heidelerg.

* cited by examiner

| Recommendations for Client Application — 521 | | |
|---|---|---|
| Interest Areas | Language | Status |
| Restaurants Nearby | English | |
| News In English | French | |
| Golf Clubs Nearby | German | |
| | Polish | |

523 (bracket under Interest Areas entries)
525 (pointing to Language entries)

METHOD AND APPARATUS FOR PROVIDING RULE-BASED RECOMMENDATIONS

BACKGROUND

Service providers and device manufacturers (e.g., wireless, cellular, etc.) are continually challenged to deliver value and convenience to consumers by, for example, providing compelling network services. One area of development has been the use of recommendation systems to provide users with suggestions or recommendations for content, items, etc. available within the services and/or related applications (e.g., recommendations regarding people, places, or things of interest such as companions, restaurants, stores, vacations, movies, video on demand, books, songs, software, articles, news, images, etc.). For example, a typical recommendation system may suggest an item to a user based on a prediction that the user would be interested in the item—even if that user has never considered the item before—by comparing the user's preferences to one or more reference characteristics. Such recommendation systems historically have been based on collaborative filters that rely on often large amounts of user data (e.g., historical rating information, use history, etc.). However, such user data often is not available or has not been collected with respect to a particular service or application. Accordingly, service providers and device manufacturers face significant technical challenges to enabling development and generation of recommendation systems and models which are not based on having large sets of user data.

SOME EXAMPLE EMBODIMENTS

Therefore, there is a need for an approach for providing rule-based recommendations that do not depend on collaborative filters and/or extensive user data.

According to one embodiment, a method comprises processing and/or facilitating a processing of one or more user profile tags, context tags, content tags, channel tags, other context information or any combination thereof. The method also comprises causing, at least in part, a determination of one or more weighting factors of one or more of the user profile tags, context tags, content tags, channel tags and other context information. The method further comprises causing, at least in part, an application of one or more rule sets that bases a determination of a recommendation on the weighting factor. The method also comprises causing, at least in part, generation of one or more recommendations.

According to another embodiment, an apparatus comprises at least one processor, and at least one memory including computer program code, the at least one memory and the computer program code configured to, with the at least one processor, cause, at least in part, the apparatus to process and/or facilitate a processing of one or more user profile tags, context tags, content tags, channel tags, other context information or any combination thereof. The apparatus is also caused to cause, at least in part, a determination of one or more weighting factors of one or more of the user profile tags, context tags, content tags, channel tags and other context information. The apparatus is further caused to cause, at least in part, an application of one or more rule sets that bases a determination of a recommendation on the weighting factor. The apparatus is also caused to cause, at least in part, generation of one or more recommendations According to another embodiment, a computer-readable storage medium carries one or more sequences of one or more instructions which, when executed by one or more processors, cause, at least in part, an apparatus to process and/or facilitate a processing of one or more user profile tags, context tags, content tags, channel tags, other context information or any combination thereof. The apparatus is also caused to cause, at least in part, a determination of one or more weighting factors of one or more of the user profile tags, context tags, content tags, channel tags and other context information. The apparatus is further caused to cause, at least in part, an application of one or more rule sets that bases a determination of a recommendation on the weighting factor. The apparatus is also caused to cause, at least in part, generation of one or more recommendations According to another embodiment, an apparatus comprises means for processing and/or facilitating a processing of one or more user profile tags, context tags, content tags, channel tags, other context information or any combination thereof. The apparatus also comprises means for causing, at least in part, a determination of one or more weighting factors of one or more of the user profile tags, context tags, content tags, channel tags and other context information. The apparatus further comprises means for causing, at least in part, an application of one or more rule sets that bases a determination of a recommendation on the weighting factor. The apparatus also comprises means for causing, at least in part, generation of one or more recommendations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing rule-based recommendations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
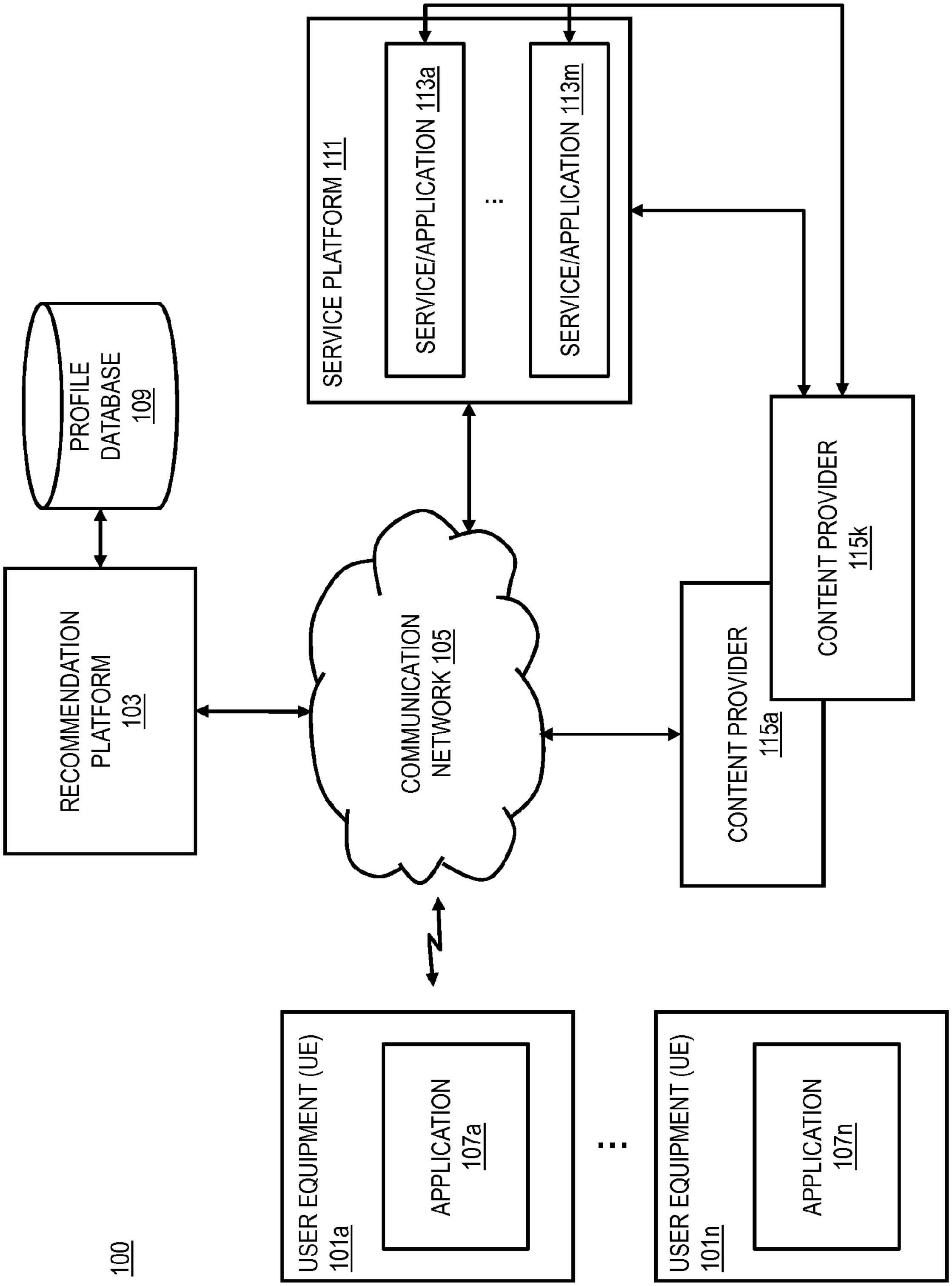
FIG. 1 is a diagram of a system capable of providing rule-based recommendations, according to one embodiment.

FIG. 1 is a diagram of a system capable of providing a framework for generating recommendation models, according to one embodiment. As previously mentioned, recommendation systems provide users with a number of advantages over traditional methods of search in that recommendation systems not only circumvent the time and effort of searching for items of interest, but they may also help users discover items that the users may not have found themselves. However, recommendation systems can be very complex due to the number of variables, functions, and data that are used to create models (e.g., collaborative filtering) for generating recommendations. By way of example, a recommendation system for a particular application may take into consideration variables such as items viewed, item viewing times, items searched, items downloaded/uploaded, items purchased, items added to a wish list, shopping cart, or favorites list, items rated and how they were rated, etc. A recommendation system may also include as many as a hundred or more different algorithmic approaches to model and/or produce a single prediction. Nevertheless, even when the numerous variables and functions have been satisfied, a recommendation system generally still requires sufficient data (e.g., item data, user data, etc.) to effectively seed its models to produce user suggestions. Because of insufficient resources and time constraints, many applications are developed without a system that can provide user suggestions or recommendations with respect to items that may be of interest to the users. In addition, a common problem in many recommendation systems is the lack of data (e.g., item data, user data, etc.). Recommendation systems typically do not make accurate inferences about users or items for which it has not yet gathered enough data.

To address this problem, a system 100 of FIG. 1 introduces the capability to use an intelligent filter and processing engine for providing rule-based recommendations. More specifically, the system 100 determines or generates one or more profile tags, context tags, channel tags and/or other context information, determines a weighting factor for each of the tags, and applies a rule set for making a recommendation based on the weighted tags.

As used in the descriptions of the various embodiments described herein, the term "context" refers to data that indicates the state of a device or the inferred state of a user of the device, or both. The states indicated by the context are, for instance, described according to one or more "context parameters" including time, recent applications running on the device, recent World Wide Web pages presented on the device, keywords in current communications (such as emails, SMS messages, IM messages), current and recent locations of the device (e.g., from a global positioning system, GPS, or cell tower identifier), movement, activity (e.g., eating at a restaurant, drinking at a bar, watching a movie at a cinema, watching a video at home or at a friend's house, exercising at a gymnasium, travelling on a business trip, travelling on vacation, etc.), emotional state (e.g., happy, busy, calm, rushed, etc.), interests (e.g., music type, sport played, sports watched), contacts, or contact groupings (e.g., family, friends, colleagues, etc.), among others, or some combination.

In one embodiment, the rule sets are determined by extracting (e.g., via a semantic analysis) language tokens or tags from content information (e.g., a general web page, document, etc.) associated with a particular context. Accordingly, when an application requests recommendation information, the system 100 can determine a target context or context combination (e.g., the context or contexts of interest specified in the request) and then obtain the corresponding rule sets for generating the recommendation information.

In one embodiment, the rule sets can be used to select the language tokens or tags that are associated with a given context parameter and context. The system 100 can then search a database (e.g., a content database) associated with the application to provide recommendation information to the application or a user of the application. In one embodiment, the system 100 advantageously separates the rule sets from the data over which the recommendations are made. Accordingly, the system 100 can be used to generate recommendation information for any number of applications because the rule sets enable the system 100 to identify general key words associated with a given context parameter and context. The key words are then used to query the application for information that is related to the tokens or tags. The results of the query are provided as recommendations. In other words, the rules sets are used to derive the "nature" (e.g., topics) of what is to be recommended. The "nature" then decides the actual data to recommend by querying a separate database or source.

For example, if a context tag is related to a location such as "New City," then a context or context type associated with the node can be a "bus station." The system 100 can then semantically analyze documents related to the bus station within the New City (e.g., newspaper articles, bus station information brochures, search histories) to extract or determine language tokens that are, for instance, most commonly or most closely associated with the location (e.g., a context parameter) and a given context (e.g., bus station) within the context parameter. For example, common language tokens that arise may include: "newsstand," "fast food," "time tables," and the like). When an application such as a mapping application requests a recommendation with respect to the bus station in New City, the system 100 locates the rule set associated with the "New City" and "bus station." On applying the rule set, the system 100 outputs "newsstand" and "fast food" as language tokens related to the New City bus station. In one embodiment, these tokens are then used to query a database of the mapping application for points of interest related to the tokens. The resulting points of interest are then provided as recommendations to the mapping application.

By way of example, in one embodiment, external users can contribute to the rule sets by specifying one or more of the language tokens or tags from which the rule sets are built. The users may also personalize the rule sets by specifying particular contexts of interests (e.g., places of interests, favorite or common activities, etc.) for higher weighting factors. The approach allows dynamic editing of rule sets (addition, removal, modifications, etc.) that the recommender is able to process thereby allowing an evolutionary and adaptive recommendation behavior. While weighting factors may be customizable, for example, this is no need for user ratings data. Rule sets may be based on domain understanding, and utilize content tags (that may be extracted through machine learning processes). Further, multiple rule sets may be linked or combined to address different context scenarios that may not be a known priority, for example. Tags for context may be location specific tags or time tags. Tags may also be based on user preferences. The approach may manage all data independent of a recommendation engine or a recommendation model. Rather, all data may be accessed through a Data Access Objects (DAO) module.

In certain embodiments, a matcher module calls the recommender to provide recommendation tokens for a particular session. The recommender fetches all needed tags through DAO. A profile engine works independently and updates user profile tags and weighting factors. The recommender fetches updated tags and related weighting factors. In this embodiment, the recommender logic can be represented as XML. This representation makes changes to logic possible. In certain embodiments, inputs to the recommender, for example, are: resolved location, resolved time, user id, resolved contexts (or context data that can be resolved through DAO). While the recommender may take a recommendation input object as an input, the input object may be extended later.

In certain embodiments, the recommender receives tags from: user profile tags provided by the profile engine, and context tags comprising: location specific tags provided by location resolver, time specific tags provided by time resolver, and other contexts provided by respective resolvers. In certain embodiments, the recommender also receives tags (e.g., channel tags) that semantically describe a channel for which content is to be recommended. More specifically, a recommendation channel may be a more finely grained category of interest that specifies one or more tokens and/or one or more rules applying those tokens to generate recommendations. For example, a Restaurant recommendation channel might have tokens: restaurant, breakfast, dinner, menu, a la carte, dining, lunch, etc. Content matching the tokens may be a restaurant website that qualifies as an entry in the Restaurant channel. In some embodiment, the tags that define that channel may be given additional weightage and combined with contextual and preference tags for content search.

In certain embodiments, the recommendation engine fetches all needed tags from a database. A matcher module drives the recommendation engine providing it with the needed data to fetch appropriate tags from the database. Data, as discussed above, thereby is not integrated with the recommendation logic. A profiler provides a continuous stream of modified tag sets for each user through a process that is independent of the recommender process. The profiler monitors user behavior and either modifies, removes or adds new tags to the user database along with weights indicating level of preference for each tag. The recommender takes in a user id and fetches all current tags that are specific to that user from the user database. Each tag, be it from context sources (i.e., separate table in database) or from user tables may have a weight associated with it. The weight could be in a range that is between 0 and 1, except in user profile tags where weights can be negative. In addition to the weight for each tag, each type of tag will have an addition or a multiplier (typically a whole number) that is indicated declaratively through a separate XML rule logic declaration. This number is also applied to the individual weights when providing a set of tags back to the matcher.

In certain embodiments, the recommender builds three sets of tags that are output to the matcher:

Context-based tag set:

The rule set defines the type of context and what weight to apply for the context. The recommendation engine fetches the tag sets for that particular context from the database. The tag set may be different for even a particular context type depending on the entries in the database. For location context, the recommender may fetch a resolved location context tag from the database. This, accordingly, would be different for each location. Once those tags are fetched, then the rule set is parsed to check the weightage needed to be given to this particular context. Then, depending on whether the weight modulation process is a multiplier or an addition, that operation is applied to the tag weights. In addition, the list of tags may be checked against user tags whose weights are negative. If there are overlapping tags whose weights are negative, these tags may be removed (depending on a threshold for negativity in a user profile) or assigned a weight of 0.

User profile-based tag set:

The same operation as above is conducted where the weights are modulated depending on the rule set being chosen. In certain embodiments, where user profile can be indexed based on contextual situations, the recommender would fetch the user profile through use of user id and the context tags. In such cases, a "contexttagmatch" section from the user profile may be chosen to add more weight (or in some cases less) to profile tags.

Profile and context tags

Only common tags from both profiles and context are used. Unless explicitly provided within the declaration (e.g. in combinationSet 2, discussed below), the common tags are first applied the contextual modulation followed by the profile modulation to the modulated weights. This would ensure that these tags have higher weights compared to individual profile or context tags.

Once the above tag sets are prepared, the recommender packages them into a particular structure for output. The output may contain each segment where primary context would be explicitly provided where applicable. In some embodiments, aspects of an explicit profile may be included in the package such as language preferences when providing this to a matcher module.

Even though the recommender and matcher are separate modules, both entities function together to produce the recommendations. The recommender recommends tags and computed weights which are then used by the matcher. The matcher fetches content from the database using the recommended tags as search criterion. The tag weights are then used to arrive at a metric score for each content that is fetched. The top N content with top metrics are then sent to the client.

The recommender, as discussed above, outputs three sets of tags. One set provides context-specific tags with statements on what the associated context is. This can be location, time or other context. The second set may provide profile specific tags while third are a combination of profile and context tags. The matcher will use each of these sets to build metrics. The top N matches are taken and then checked whether they are from context only, preference only or context and preference combined. This information is also embedded in the response that is sent back to the user.

In certain embodiments, the system 100 can localize or translate the recommendation information from its native language to a target language. In one approach, the system 100 can localize information by performing a translation of the one or more language tokens and/or results of the query based on the language tokens into the target language. In addition or alternatively, the system 100 can extract a target-language specific set of tokens from related content documents that are already in the target language.

As noted previously, defining rule sets for generating recommendations as described herein enables the system 100 to provide recommendations that can be adapted to any number or combination of contexts without need for user data models typical of traditional collaborative approaches to generating recommendations.

As shown in FIG. 1, the system 100 comprises a user equipment (UE) 101 or multiple UEs 101*a*-101*n* (or UEs 101) having connectivity to a recommendation platform 103 via a communication network 105. A UE 101 may include or have access to an application 107 (or applications 107), which may comprise of client programs, services, or the like that may utilize a system to provide recommendations to users. As users access the applications 107 on their respective UEs 101, the recommendation platform 103 may generate and/or provide recommendation information (e.g., data indicating how a user might rate an item) for the applications 107 according to the approach described herein. As described above, the recommendation information is generated according to a one or more rule sets defined for a given context or combination of contexts. Because of the system 100 uses rule sets to generate recommendations, the system 100 need not rely only user data such as historical content rating information that is typically collected by, for instance, asking a user to rate an item on a scale of one through ten, asking a user to create a list of items that the user likes, observing items that the user views, obtaining a list of items that the user purchases, analyzing the user's viewing times of particular items, etc. Instead, the recommendation platform 103 may provide the applications 107 with content recommendations even when content rating information or other collaborative data are not available to produce intelligent recommendations. In one embodiment, the recommendation platform 103 may include or be connected to a profile database 109 in order to access or store user preferences and other setting related to requesting, generating, or otherwise obtaining rule-based recommendations. By way of example, the preferences or settings of the recommendation platform 103 include: default language settings, search settings, references to external search engines, priority of tokens or tags, rule processing options, translation settings, input settings, etc.

As shown, the UEs 101 and the recommendation platform 103 also have connectivity to a service platform 111 hosting one or more respective services/applications 113*a*-113*m* (also collectively referred to as services/applications 113), and content providers 115*a*-115*k* (also collectively referred to as content providers 115). In one embodiment, the services/applications 113*a*-113*m* comprise the server-side components corresponding to the applications 107*a*-107*n* operating within the UEs 101. In one embodiment, the service platform 111, the services/applications 113*a*-113*m*, the application 107*a*-107*n*, or a combination thereof have access to, provide, deliver, etc. one or more items associated with the content providers 115*a*-115*k*. In other words, content and/or items are delivered from the content providers 115*a*-115*k* to the applications 107*a*-107*n* or the UEs 101 through the service platform 111 and/or the services/applications 113*a*-113*n*.

In some cases, a developer of the services/applications 113*a*-113*m* and/or the applications 107*a*-107*n* may request that the recommendation platform 103 generate one or more recommendations with respect to content or items obtained from the content providers 115*a*-115*k*. The developer may, for instance, transmit the request on behalf of the application 107 and/or the services/applications 113 to the recommendation platform 103 for the purpose of generating recommendation information and/or the rule sets, contexts, etc. After receiving the request for recommendation information, the recommendation platform 103 may then retrieve the rule sets, language tokens, and/or the like from one or more profiles associated with the application 107, the services/applications 113, one or more other applications, or a combination thereof. The recommendation platform 103 may further generate the content recommendation based at least in part on the retrieved rule sets, etc. Because the content recommendation information may be derived from one or more rules that apply via an agnostic or nonspecific recommendation model, the same rule sets are applicable to any number of the application 107, the services/applications 113 and/or one or more other applications. Thus, even if in the absence of user data, the recommendation platform 103 is able to provide recommendation information that represents accurate predictions with respect to suggesting items of interest to users for a requesting application 107 and/or services/applications 113.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the recommendation platform 103, and the application 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the corresponding service platform 111, services 113*a*-113*m*, the content providers 115*a*-115*k*, or a combination thereof interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
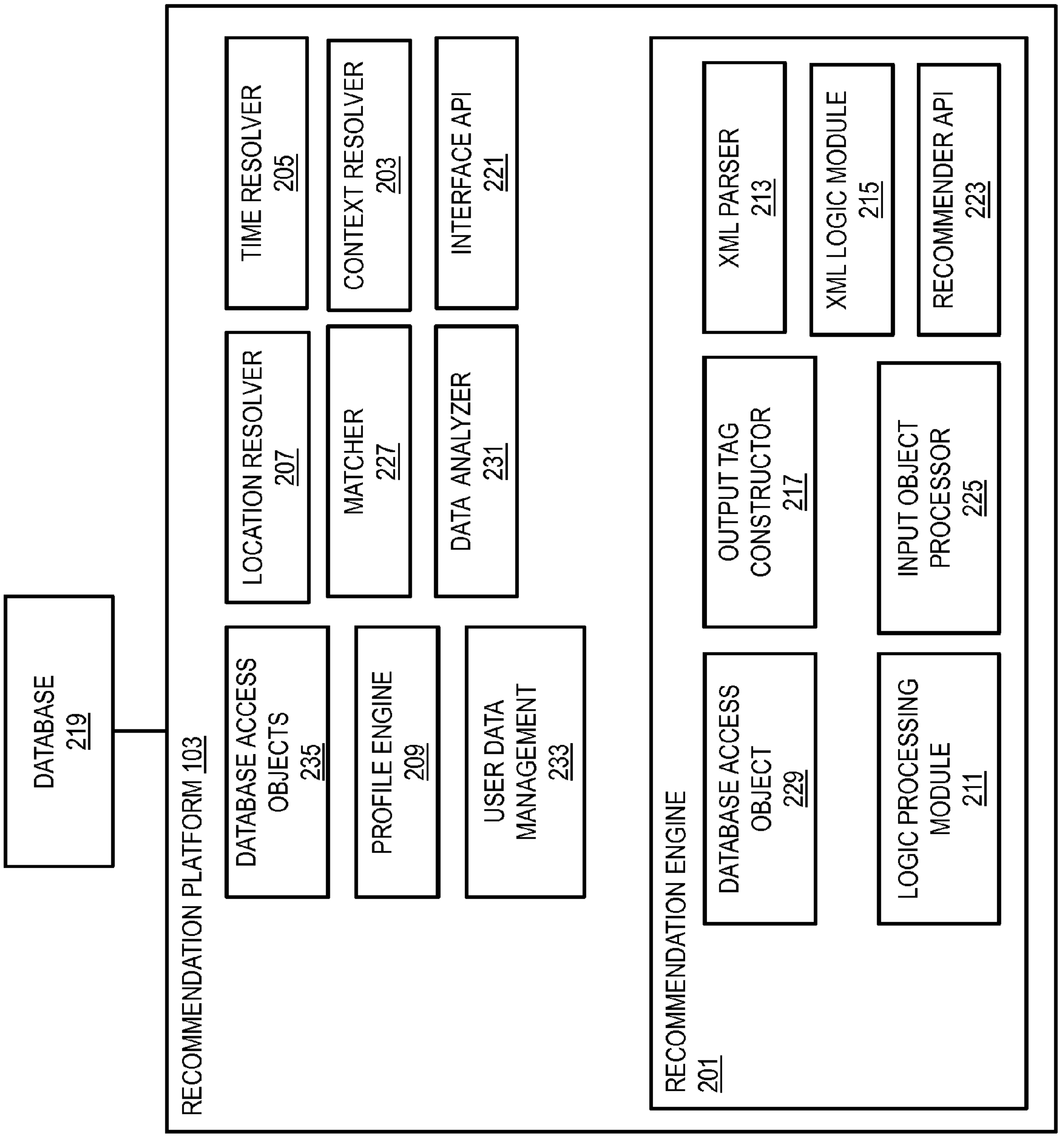
FIG. 2 is a diagram of the components of a recommendation platform, according to one embodiment.

FIG. 2 is a diagram of the components of a recommendation platform, according to one embodiment. By way of example, the recommendation platform 103 includes one or more components for providing rule-based recommendations. It is contemplated that the functions of these components may be combined in one or more components or performed by other components of equivalent functionality. In this embodiment, the recommendation platform 103 includes at least a recommendation engine 201 which executes at least one algorithm for performing and/or coordinating the functions of the recommendation platform 103. In one embodiment, the functions of the recommendation engine 201 can be generally grouped into two areas: (1) creating the rule sets for determining recommendation information; and (2) applying the rule sets to generate and/or provide the recommendation information to one or more applications 107 and/or services 113*a*-113*m*.

In one embodiment, with respect to creating the rule sets, the recommendation engine 201 receives configuration information specifying one or more context parameters (e.g., location, time, activity, or a combination thereof) from a context resolver 203, a time resolver 205 and/or a location resolver 207 from which to generate a recommendation.

In certain embodiments, the one or more context parameters may be combined to provide for more complex contexts. For example, location may be combined with time to generate the rule set. In this case, each location input may be further qualified or supplemented with time information. For instance, a context might specify a city with time broken out as morning, noon, afternoon, evening, night, etc. In this example, each permutation of city and time represents a separate node or context. It is contemplated that any number of context parameters may be combined to create contexts of varying complexity and intricacies.

In one embodiment, the recommendation engine 201 interacts with the logic processing module 211 to define one or more rule sets for generating a recommendation. In one embodiment, the logic processing module 211 can build a rule set based on manual input, thereby enabling, for instance, a service provider, network operator, and the like to provide input to write and/or build the rule sets. In one embodiment, the logic processing module 211 in cooperation with a XML parser 213 can formulate one or more rule sets that correlate a context or context type with one or more language tokens or tags. By way of example, in one embodiment, external users can contribute to the rule sets by specifying one or more of the language tokens or tags from which the rule sets are built. The users may also personalize the rule sets by specifying particular contexts of interests (e.g., places of interests, favorite or common activities, etc.) for higher weighting factors.

In another embodiment, the user can manually specify one or more of the tokens, rule sets, contexts, context parameters, etc. Then the logic processing module 211 can automatically build out or infer additional rules or weighting factors based on the manual input.

In one embodiment, to generate the language tokens or tags, the logic processing module 211 and/or the XML parser 213 and an XML logic definition module 215 in cooperation with the recommendation engine 201 identifies or determines a set of content information associated with the context and/or context type. The content information may be any document or source that includes language related to the context and/or context type (e.g., a Wikipedia article). In one embodiment, the recommendation engine 201 then creates a language model that describes the most prevalent or main words or terms that appear in each of the content information. By way of example, for each content information or information resource, text or other information is extracted as language tokens or tags (e.g., each language token represents a word or phrase). For instance, each of the content information is crawled and parsed to obtain text. Since the text data are largely unstructured and can comprise tens of thousands of words, automated topic modeling can be used for locating and extracting language tokens from the text.

In one embodiment, the recommendation engine 201 extracts the noun tokens, and then performs a histogram cut to extract the least common nouns. To extract the noun tokens, the recommendation engine 201 can deploy a part-of-speech tagging (POST) to mark up nouns in the text. POST is a process of marking up nouns in a text (corpus) as corresponding to a particular part of speech, based on both its definition, as well as its context. Part-of-speech tagging is more than just having a list of words and their parts of speech, because some words can represent more than one part of speech at different times. For example, "dogs" is usually a plural noun, but can be a verb. The recommendation engine 201 then extracts nouns using a language dictionary, and stores the noun tokens as a noun set.

The noun set obtained is then used to build a model to represent the content information associated with the contexts by extracting tokens with similar probability and range from a larger language model (e.g., Wikipedia or other large collection of meaningful words) or performing other similar probabilistic analysis of the tokens. In one example, topic models, such as Latent Dirichlet Allocation (LDA), are useful tools for the statistical analysis of document collections. For example, LDA is generative probabilistic model as well as a "bag of words" model. In other words, the words or tokens extracted from text of the content information are assumed to be exchangeable within them. The LDA model assumes that the words of each document arise from a mixture of topics, each of which is a probability distribution over the vocabulary. As a consequence, LDA represents documents as vectors of word counts in a very high dimensional space, while ignoring the order in which the words or tokens appear. While it is important to retain the exact sequence of words for reading comprehension, the linguistically simplistic exchangeability assumption is essential to efficient algorithms for automatically eliciting the broad semantic themes in a collection of language token.

Another example of a modeling algorithm is the probabilistic latent semantic analysis (PLSA) model. PLSA is a statistical technique for analyzing two-mode and co-occurrence data. PLSA was evolved from latent semantic analysis, and added a sounder probabilistic model. PLSA has applications in information retrieval and filtering, natural language processing, machine learning from text, and related areas. Regardless of the model used, it is contemplated that the recommendation engine 201 in cooperation with the logic processing module 211 and/or XML parser 213 can generate the language tokens associated with a particular context or context type. In one embodiment, the XML parser 213 generates the rule set in eXtensible Markup Language (XML) or other similar language. The declarative form is parsed by an XML parser and provided to Logic Processing Module (LPM) where the different combinations provided are taken to account. This allows for dynamic editing of recommender logic as well as selective logics based on context under which the server performs. The XML declarative logic can also choose a particular recommendation combination depending on submitted user context (not implemented though for release 3). In certain embodiments, a user interface (UI) that allows a systems user to modify the XML logic definition may be provided. An example of an XML rule set is provided below:

```
<recommendationLogic>
<select>
//for selecting a particular combination set based on context types
//not implemented for version 3 release
</select>
<combinationType status=disabled><combinationType>
<combinationType status=enabled><id> 1 </id><combinationType>
<combinationType status=disabled><combinationType>
<combinationSet id=1>
<context type=location>
<maxtags>20</maxtags>
    <weight type=multiplicator>2</weight>
    <weight type=addition>1</weight>
    </context>
    <context type=time>
    <maxtags>20</maxtags>
    <weight type=multiplicator>2.5</weight>
    <weight type=addition>1.5</weight>
    </context>
    <profile>
    <maxtags></maxtags>
    <weight type=multiplicator>3</weight>
    <weight type=addition>2</weight>
    <profile>
    </combinationSet>
    <combinationSet id=2>
    <context type=location>
    <maxtags>20</maxtags>
    <weight type=multiplicator>2</weight>
    <weight type=addition>1</weight>
    </context>
    <context type=time>
    <maxtags>20</maxtags>
    <weight type=multiplicator>2.5</weight>
    <weight type=addition>1.5</weight>
    </context>
    <profile>
    <maxtags></maxtags>
    <weight type=multiplicator>3</weight>
    <weight type=addition>2</weight>
    <contexttagmatch type=location>
    <weight type=multiplicator>4</weight>
    <weight type=addition>3</weight>
    </contexttagmatch>
    <contexttagmatch type=time value=morning>
    <weight type=multiplicator>4.5</weight>
    <weight type=addition>3.2</weight>
    </contexttagmatch>
        <profile>
        <profile-context>
        <maxtags>20</maxtags>
```

-continued

```
<weight type=multiplicator>2.5</weight>
<weight type=addition>1.5</weight>
    </profile-context>
</combinationSet>
</recommendationLogic>
```

In certain embodiments, the recommender exposes an Application Programming Interface (API) that allows initializing, performing recommendation functions and returning a response. The API may run, for example:

Void initializeRecommender(String databaseType, Struct DatabaseStruct);

Struct TagList RunRecommender(Struct recommenderObject);

Void RunRecommenderNon-Blocking(StructrecommenderObject, fnReturnMethod retMethod);

Function fnReturnMethod(Struct TagList);

In some embodiments, the logic processing module 211 can also interact with the output tag constructor 217 to translate or otherwise convert the language tokens and/or rule sets to a target or specified language, thereby enabling interoperability of the tokens among multiple languages. For example, a recommendation request may come from web pages or service 113 in multiple languages even when operating within a particular region. The tags mentioned with the rule may be for one language. In one embodiment, the rule set does support explicit language definitions within regions but not all languages may be supported. In such cases, the logic processing module 211 can deploy the output tag constructor 217 that can translate tags or tokens from one language to another. In one embodiment, the translation can be performed after resolution of the tags in one language (e.g., English or whatever the language may be within the rules for a particular area).

As shown in FIG. 2, the recommendation platform 103 has connectivity to a database 219 of rule sets for storing the generated rule sets and corresponding language tokens. As described previously, the rule sets operate to determine the appropriate set of language tokens to apply to generate recommendation information for a given context and/or context type.

From the perspective of generating rule-based recommendations, the recommendation engine 201 interacts with an interface application programming interface (API) 221 by way of a recommender API 223 to receive requests for recommendations from, for instance, the application 107 and/or services 113. In one embodiment, the request may include parameters such as context information (e.g., a set of one or more contexts) associated with the application 107 or UE 101 associated with the request. It is noted that these parameters are optional. In one embodiment, the default behavior in case no parameters are provided would be a temporal recommendation that is based on the most general or root level rule set.

In one embodiment, due to the universally applicable nature of the rule sets, complexity of assigning rules to specific values, desire to reduce complexity, the recommendation engine 201 can interact with the input object processor 225 to receive the request and/or parameters and process them via an input object processor 225. In this example, the input object processor 225 normalizes or maps input values or parameters to specific boundaries of the context parameters (depending on how context parameters are interpreted) that makes them easier to process via the applicable rule sets.

In the example of FIG. 2, the input object processor 225 has connectivity to a location resolver 207, a time resolver 205, and context resolver 203. Although these three types of input resolvers are depicted, it is contemplated that the recommendation platform 103 may include any one or more of the input resolvers in any combination. In one embodiment, the location resolver 207 relies on an external location database (e.g., considered as part of the location resolver 207). The location database contains, for instance, border point definition for places. The location resolver 207 is able to map a given coordinate within the border point definitions and to a specific place name within the database. The resolved place name form a given coordinate is then used for rule resolution.

In another embodiment, a second database may be employed that maps a place name to a specific path in the rule set. For example, the path can assist the recommendation platform 103 to speed up identification of the specific rule sets to be applied for a resolved location. In one embodiment, the recommendation rule sets can be based on location, and it is assumed that given a location, a rule can be identified within the rule set for that location. In one embodiment, the raw location data is not used directly in the rule set, but is used in the location resolver 207 to identify a place name. However, in other embodiments, the raw location data can be used directly to determine an applicable rule or rule set.

In one embodiment, the input object processor 225 also has connectivity to a time resolver 205. By way of example, the time resolver 205 resolves the given time relative to, for instance, the client device (e.g., the UE 101) to a given part of day. This process essentially maps a given time of day into one of enumerated part-of-day definitions for the rule set. Table 1 provides examples of enumerated definitions and their corresponding boundaries.

TABLE 1

| Interval name | Boundary value |
|---|---|
| Early-morning | 4:00-7:59 |
| Morning | 8:00-9:59 |
| Late-morning | 10:00-11:59 |
| Noon | 12:00-12:59 |
| Afternoon | 13:00-15:59 |
| Evening | 16:00-17:59 |
| Late-evening | 18:00-19:59 |
| Night | 20:00-23:59 |
| Mid-night | 00:00-3:59 |

In embodiments where the rule set is based on other types of context parameters (e.g., an activity), the context resolver 203 can be used to establish the appropriate boundaries and resolve the context.

In embodiments, the recommendation engine 201 may also communicate with a data analyzer 231, a profile engine 209, and/or a user data management module 233 for additional context information or preference information available about points of interest regarding a particular user. The data analyzer 231 may also communicate with the matcher 227, discussed below, to aid in the matching processes to generate a recommendation.

Following resolution of the input, the recommender manager module interacts with the logic processing module 211 and/or XML parser 213 to retrieve the appropriate rules or rules set based on the input. Based on the retrieved rules and the input, the logic processing module 211 determines the target set of language tokens or tags to generate the recommendation information. The recommendation engine 201 initiates transmission of the target set of language tokens to the matcher 227. In one embodiment, the matcher 227 uses the target set of language tokens to query one or more databases of the service 113 or application 107 requesting the recommendations (e.g., databases of the service platform 111 and/ or the content providers 115). The recommendation engine 201 then returns the results of the query to the requesting service 113 or application 107 via the data access object module 229 and the application programming interface 213.

In one embodiment, the database access object module 229 within the recommendation engine 201 facilitates a creation and/or a modification of at least one device user interface element, at least one device user interface functionality, or a combination thereof based, at least in part, on information, data, messages, and/or signals resulting from any of the processes and or functions of the recommendation platform 103 and/or any of its components or modules. By way of example, a device user interface element can be a display window, a prompt, an icon, and/or any other discrete part of the user interface presented at, for instance, the UE 101. In addition, a device user interface functionality refers to any process, action, task, routine, etc. that supports or is triggered by one or more of the user interface elements. For example, user interface functionality may enable speech to text recognition, haptic feedback, and the like. Moreover, it is contemplated that the database access object module 229 can operate based at least in part on processes, steps, functions, actions, etc. taken locally (e.g., local with respect to a UE 101) or remotely (e.g., over another component of the communication network 105 or other means of connectivity). Another database access object module 235 may also be present within the recommendation platform 103 that also facilitates a creation and/or a modification of at least one element or input within the recommendation platform 103. Access may be granted to a user to modify the recommendation engine 201, for example, by initiating a communication between the database access object module 235 and the database access object module 229.

Figure 3:
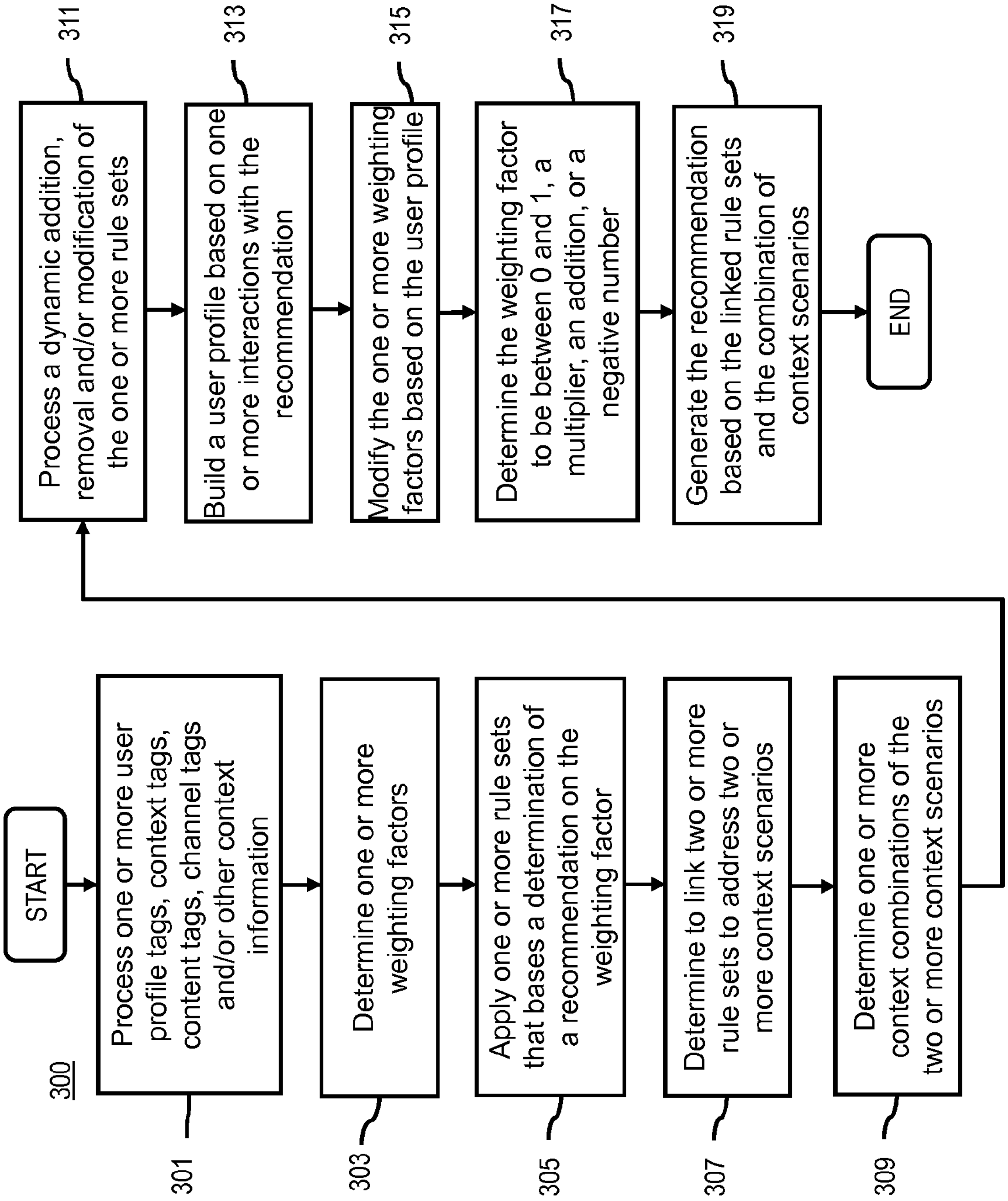
FIG. 3 is a flowchart of a process for generating rule-based recommendations, according to one embodiment.
Figure 7:
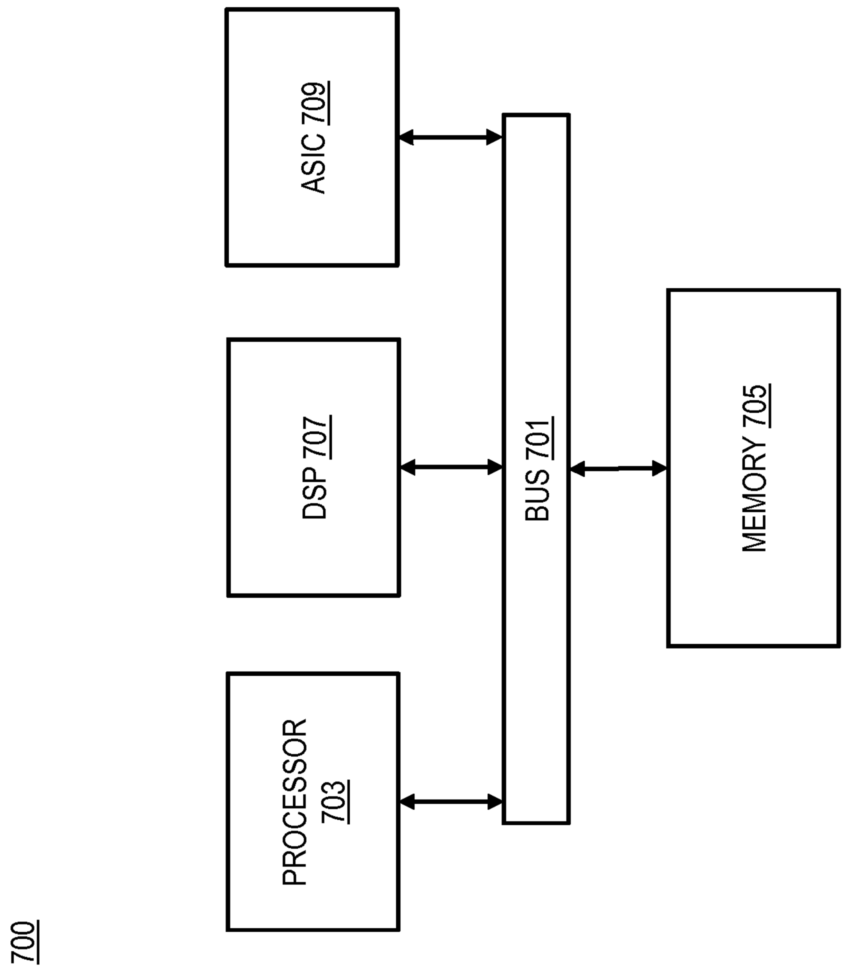
FIG. 7 is a diagram of a chip set that can be used to implement an embodiment of the invention.

FIG. 3 is a flowchart of a process for generating a rule set rule-based recommendations, according to one embodiment. In one embodiment, the recommendation platform 103 performs the process 300 and is implemented in, for instance, a chip set including a processor and a memory as shown in FIG. 7. In step 301, the recommendation platform 103 determines processes one or more user profile tags, context tags, content tags, channel tags, other context information or any combination thereof. The context tags are one or more of location specific tags provided by the location resolver 207, time specific tags provided by the time resolver 205, other context tags provided by context specific resolvers 203, and the user profile tags are provided by a profile engine.

The process continues to step 303 in which the recommendation platform 103 determines one or more weighting factors of one or more of the user profile tags, context tags, content tags, channel tags and other context information. The process continues to step 305 in which the recommendation platform 103 applies one or more rule sets that bases a determination of a recommendation on the weighting factor. The rule set may define a type of context and the weighting factor to apply for generating the one or more recommendations.

The process optionally continues to step 307 in which the recommendation platform 103 processes a determination to link the two or more rule sets to address two or more context scenarios. Next, the process optionally continues to step 309 in which the recommendation platform 103 generates at least one recommendation based on the linked rule sets and the determined combination of context scenarios. The process optionally continues to step 311 in which the recommendation platform 103 processes a dynamic addition, removal, modification, or combination thereof of the one or more rule sets by way of an administrative interface. Next, in step 313, the recommendation platform builds a user profile based on one or more interactions with the recommendation. Then, in step 315, the recommendation platform processes a modification of the one or more weighting factors based on the user profile. Next, the process optionally continues to step 317 in which the recommendation platform 103 processes a determination of the weighting factor to be between 0 and 1, a multiplier, an addition, or a negative number. The process continues to step 319 in which the recommendation platform 103 generates a recommendation based on the linked rule sets and the combination of context scenarios.

Figure 4:
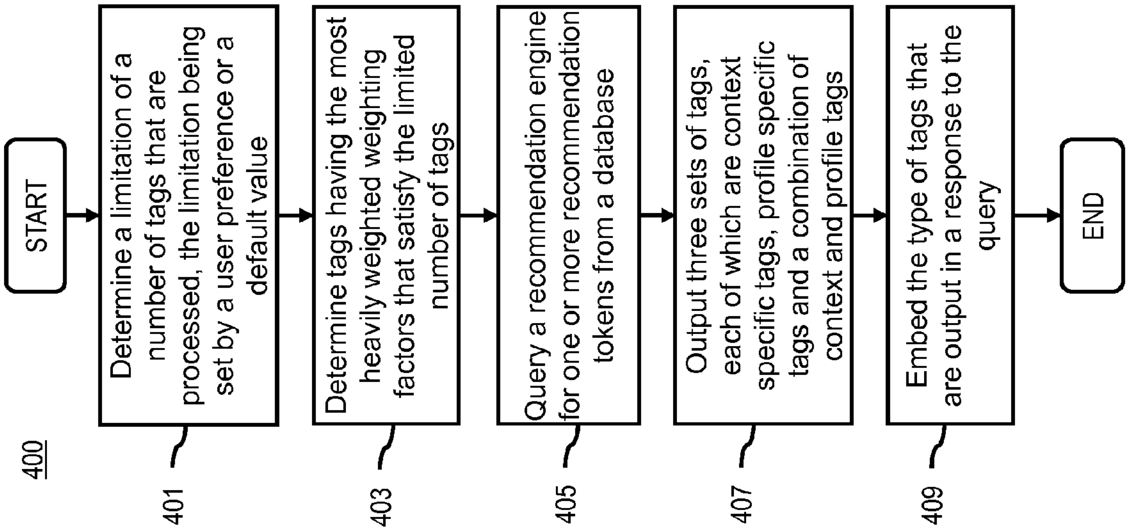
FIG. 4 is a flowchart of a process for providing rule-based recommendations based on a query, according to one embodiment.

FIG. 4 is a flowchart of a process for providing rule-based recommendations based on a query, according to one embodiment. In one embodiment, the recommendation platform 103 performs the process 400 and is implemented in, for instance, a chip set including a processor and a memory as shown in FIG. 7. In step 401, the recommendation platform 103 determines a limitation of a number of tags that are processed, the limitation being set by a user preference or a default value. Such a limitation may be helpful to result in more accurate and relevant recommendations that a user may review so that the user is not inundated with an overwhelming number of recommendations. Next, in step 403, the recommendation platform 103 determines which tags have the most heavily weighted weighting factors that satisfy the limited number of tags, and the application of the one or more rule sets bases the determination of the one or more recommendations on the limited number of tags having the most heavily weighted weighting factors. The process continues to step 405 in which the recommendation platform 103 queries a recommendation engine for one or more recommendation tokens from a database. Then, in step 407, the recommendation platform outputs three sets of tags, each of which are context specific tags, profile specific tags and a combination of context and profile tags. The process continues to step 409 in which the recommendation platform 103 embeds the type of tags that are output in a response to the query.

Figure 5A:
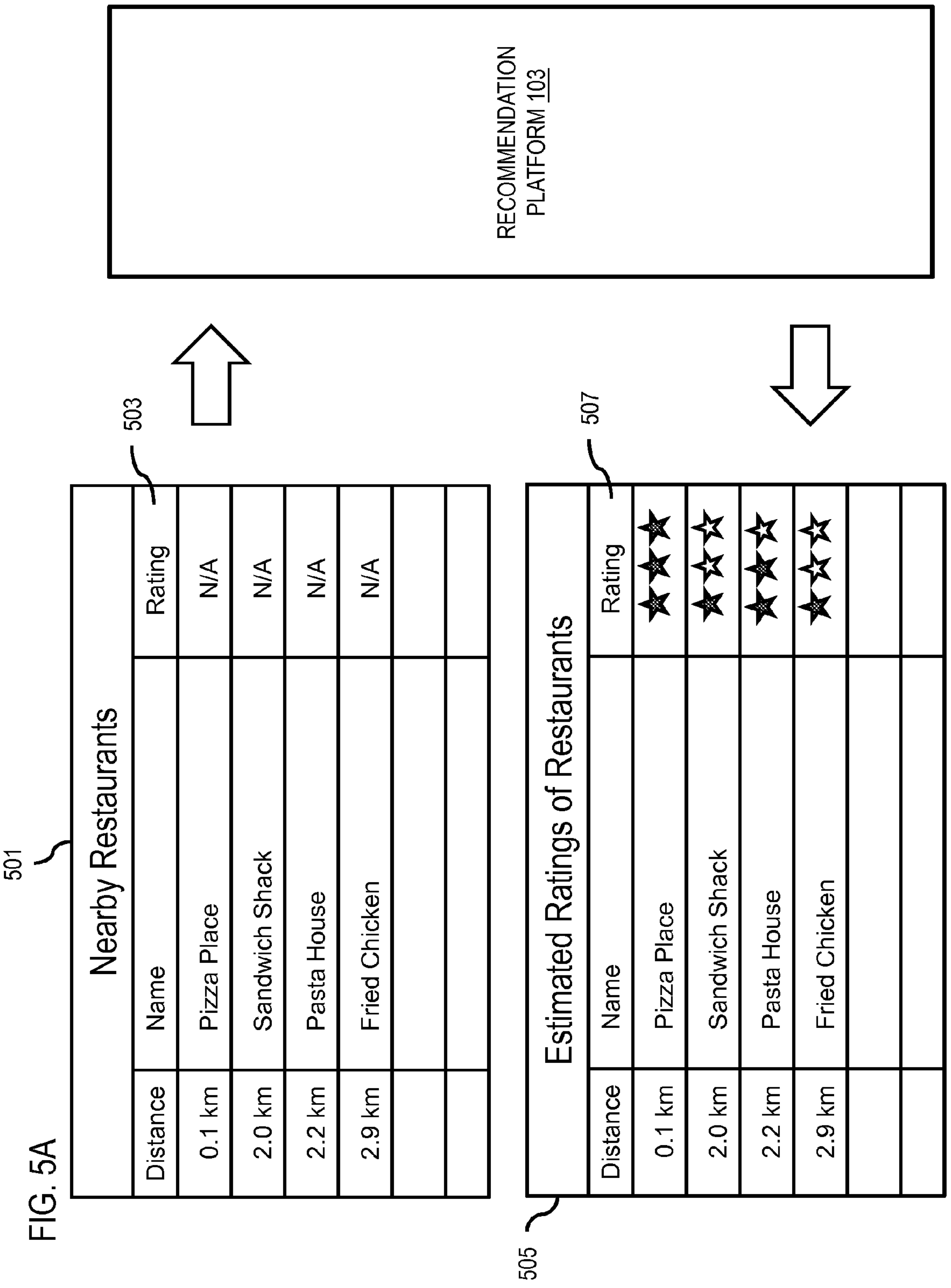
FIGS. 5A and 5B are diagrams of user interfaces used in the processes of FIGS. 3 and 4, according to one embodiment.
Figure 5B:
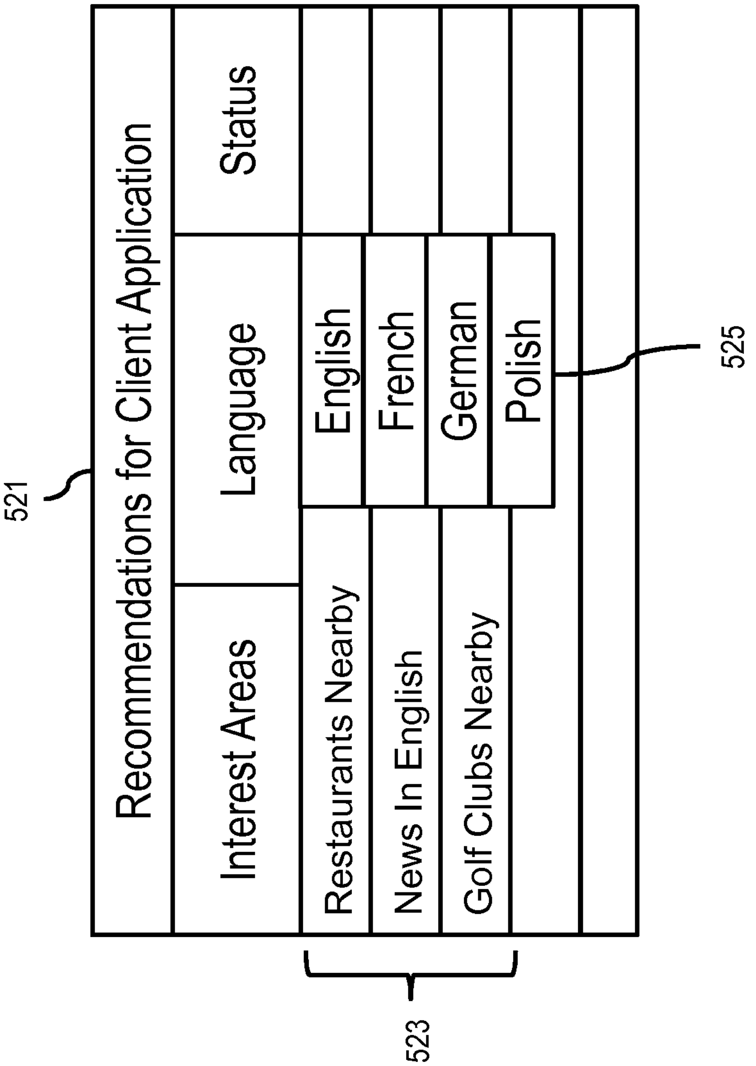

FIGS. 5A and 5B are diagrams of user interfaces used in the processes of FIGS. 3 and 4, according to one embodiment. In the examples of FIGS. 5A and 5B, the user interface (UI) 501 of FIG. 5A and the UI 521 of FIG. 5B include one or more user interface elements and/or functionalities created and/or modified based, at least in part, on information, data, and/or signals resulting from any of the processes (e.g., process 300 and process 400) described with respect to FIGS. 3 and 4. More specifically, FIG. 5A depicts a user interface (UI) 501 that presents, for instance, search results for nearby restaurants generated by a mapping application. As shown, the UI 501 includes a rating column 503 in which the user may indicate or otherwise input a rating for the listed restaurants. In this example, there are no user specified ratings so the mapping application is unable to generate recommendations under the traditional collaborative filtering or data-based approach.

Instead, the mapping information can request that the recommendation platform 103 provide rule-based recommendation information in the form of estimated restaurant ratings. As shown in UI 505, the ratings column 507 is not populated according to the recommendation information provided by the recommendation platform 103. For example, based on its rule-based analysis of context information associated with the user's location, the recommendation platform estimates that the user will give a rating of 3 out of 3 stars to the Pizza Place.

FIG. 5B depicts a UI 521 that presents example recommendation requests 523 that can be submitted using any of the languages listed in the menu 525 (e.g., English, French, German, Polish). In this example, the recommendation requests 523 are shown with English as the selected language. If, however, the user were to select, for instance, French, the recommendation requests 523 would be shown in French. Moreover, in one embodiment, changing the language from one to another does not result in a direct translation of the recommendation requests 523 and any resulting recommendations. Instead, the language tokens preferences and the weighting factors used to generate language dependent rule sets for determining recommendations may provide different results that are culturally appropriate for the selected language.

For example, searches conducted using the different languages with the same context parameters (e.g., the same location) may result in different recommendations. By way of example, a search for recommendations related to "Restaurants Nearby" may result in an "English Tea House" for recommendations requested in English, but may result in a "French Boulangerie" which recommendations are requested in French.

The processes described herein for providing rule-based recommendations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
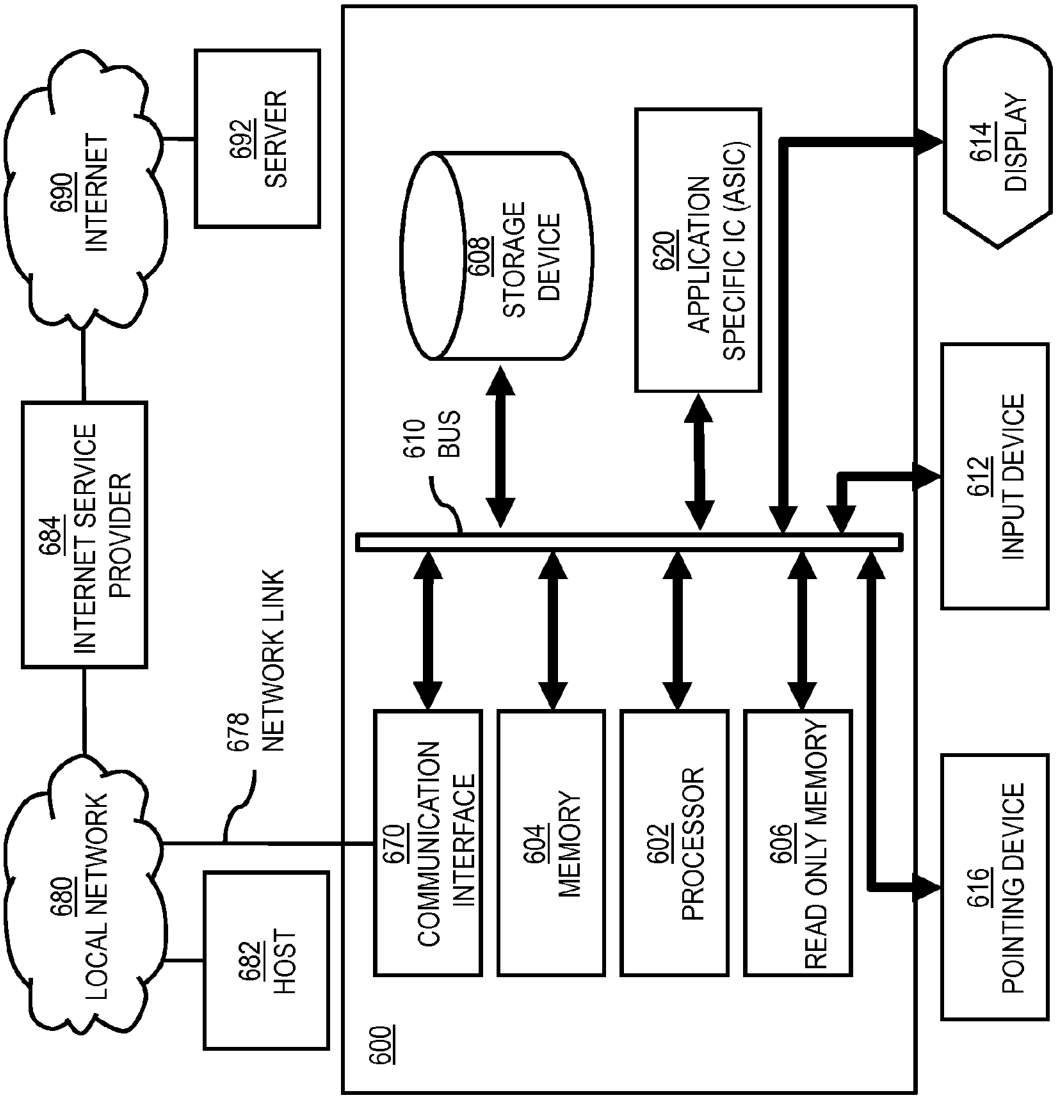
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide rule-based recommendations as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing rule-based recommendations.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing rule-based recommendations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing rule-based recommendations. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing rule-based recommendations, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing rule-based recommendations to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide rule-based recommendations as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing rule-based recommendations.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide rule-based recommendations. The memory 705 also stores the data associated with or generated by the execution of the inventive steps.

Figure 8:
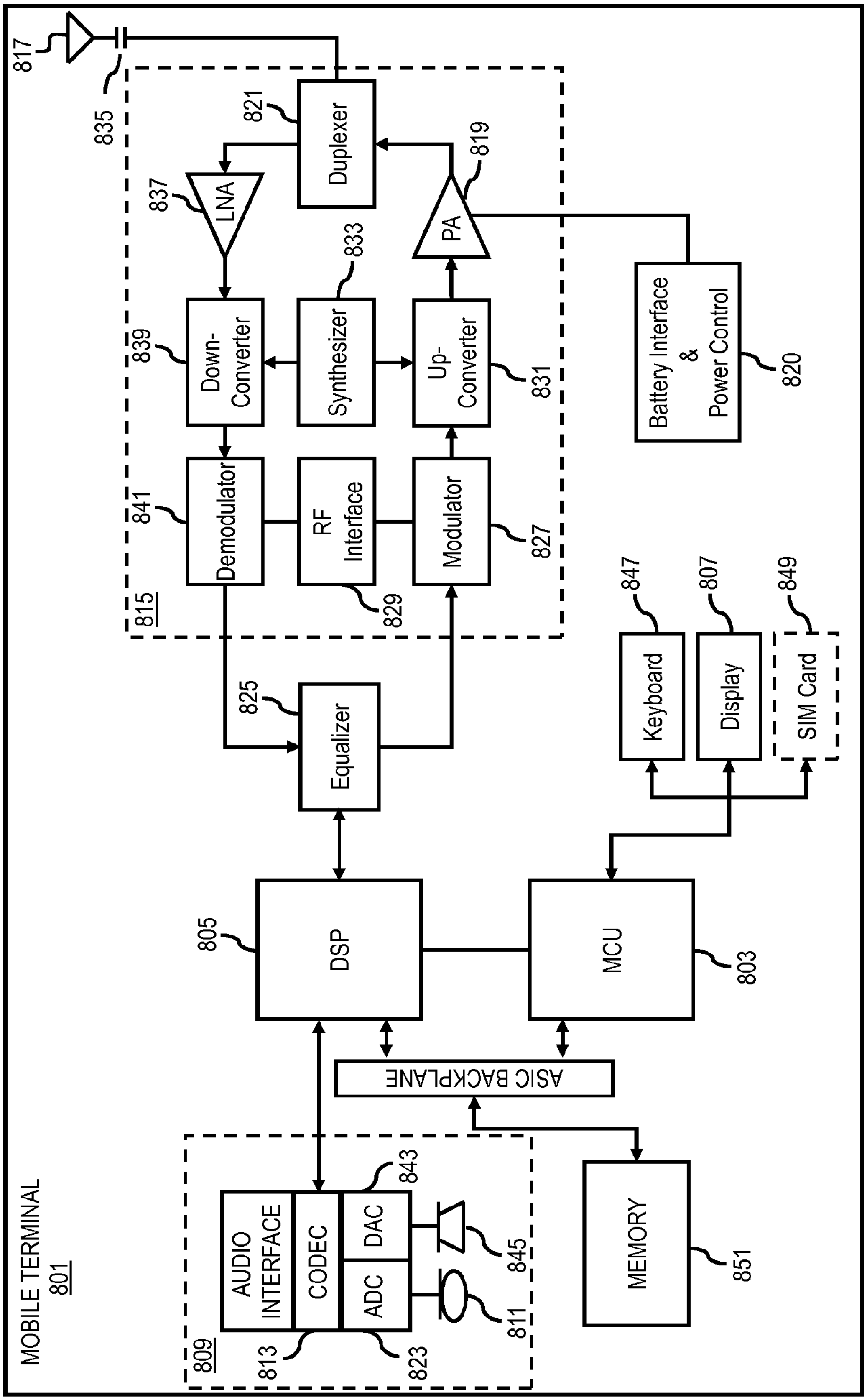
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing rule-based recommendations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing rule-based recommendations. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide rule-based recommendations. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

a processing of context information associated with at least one user device, wherein the context information includes one or more user profile tags, context tags, content tags, channel tags, other context information or a combination thereof;

a determination of one or more weighting factors based, at least in part, on the context information;

an application of one or more rule sets that bases a determination of a recommendation, at least in part, on the one or more weighting factors;

a processing of a determination to link two or more of the one or more rule sets to address two or more context scenarios associated with the context information; and a generation of one or more recommendations based, at least in part, on the one or more rule sets.

2. A method of claim 1, wherein the (1) data and/or (2) information and/or (3) at least one signal are further based, at least in part, on the following:

a processing of a determination of one or more context combinations of the two or more context scenarios; and a generation of the at least one recommendation based on the linked rule sets and the determined combination of context scenarios.

3. A method of claim 1, wherein the (1) data and/or (2) information and/or (3) at least one signal are further based, at least in part, on the following:

a processing of an addition, removal, modification, or combination thereof of the one or more rule sets by way of an administrative interface.

4. A method of claim 1, wherein the (1) data and/or (2) information and/or (3) at least one signal are further based, at least in part, on the following:

building a user profile based on one or more interactions with the recommendation; and a processing of a modification of the one or more weighting factors based on the user profile.

5. A method of claim 1, wherein the (1) data and/or (2) information and/or (3) at least one signal are further based, at least in part, on the following:

a processing of a determination of the one or more weighting factors to be between 0 and 1, a multiplier, an addition, or a negative number.

6. A method of claim 1, wherein the one or more rule sets defines a type of context and the one or more weighting factors to apply for generating the one or more recommendations.

7. A method of claim 1, wherein the context tags are one or more of location specific tags provided by a location resolver, time specific tags provided by a time resolver, other context tags provided by context specific resolvers, and the user profile tags are provided by a profile engine.

8. A method of claim 1, wherein the (1) data and/or (2) information and/or (3) at least one signal are further based, at least in part, on the following:

a determination of a limitation of a number of tags that are processed, the limitation being set by a user preference or a default value; and a determination of tags having the most heavily weighted weighting factors that satisfy the limited number of tags, wherein the application of the one or more rule sets bases the determination of the one or more recommendations on the limited number of tags having the most heavily weighted weighting factors.

9. A method of claim 1, wherein the (1) data and/or (2) information and/or (3) at least one signal are further based, at least in part, on the following:

a determination to query a recommendation engine for one or more recommendation tokens from a database.

10. A method of claim 1, wherein the (1) data and/or (2) information and/or (3) at least one signal are further based, at least in part, on the following:

an output of three sets of tags, each of which are context specific tags, profile specific tags or a combination of context and profile tags; and embedding the type of tags that are output in a response to a query.

11. An apparatus comprising:

at least one processor; and at least one memory including computer program code for one or more programs, the at least one memory and the computer program code configured to, with the at least one processor, cause the apparatus to perform at least the following:

process and/or facilitate a processing of context information associated with at least one user device, wherein the context information includes one or more user profile tags, context tags, content tags, channel tags, other context information or a combination thereof;

cause, at least in part, a determination of one or more weighting factors based, at least in part, on the context information, cause, at least in part, an application of one or more rule sets that bases a determination of a recommendation, at least in part, on the one or more weighting factors, process and/or facilitate a processing of a determination to link two or more of the one or more rule sets to address two or more context scenarios associated with the context information; and cause, at least in part, a generation of one or more recommendations based, at least in part, on the one or more rule sets.

12. An apparatus of claim 11, wherein the apparatus is further caused to perform at least the following:

process and/or facilitate a processing of a determination of one or more context combinations of the two or more context scenarios, and cause, at least in part, a generation of the at least one recommendation based on the linked rule sets and the determined combination of context scenarios.

13. An apparatus of claim 11, wherein the apparatus is further caused to perform at least the following:

process and/or facilitate a processing of an addition, removal, modification, or combination thereof of the one or more rule sets by way of an administrative interface.

14. An apparatus of claim 11, wherein the apparatus is further caused to perform at least the following:

cause, at least in part, building a user profile based on one or more interactions with the recommendation, and process and/or facilitate a processing of a modification of the one or more weighting factors based on the user profile.

15. An apparatus of claim 11, wherein the apparatus is caused to perform at least the following:

process and/or facilitate a processing of a determination of the one or more weighting factors to be between 0 and 1, a multiplier, an addition, or a negative number.

16. An apparatus of claim 11, wherein the one or more rule sets defines a type of context and the one or more weighting factors to apply for generating the one or more recommendations.

17. An apparatus of claim 11, wherein the context tags are one or more of location specific tags provided by a location resolver, time specific tags provided by a time resolver, other context tags provided by context specific resolvers, and the user profile tags are provided by a profile engine.

18. An apparatus of claim 11, wherein the apparatus is further caused to perform at least the following:

cause, at least in part, a determination of a limitation of a number of tags that are processed, the limitation being set by a user preference or a default value, and cause, at least in part, a determination of tags having the most heavily weighted weighting factors that satisfy the limited number of tags, wherein the application of the one or more rule sets bases the determination of the one or more recommendations on the limited number of tags having the most heavily weighted weighting factors.

19. An apparatus of claim 11, wherein the apparatus is further caused to perform at least the following:

cause, at least in part, a determination to query a recommendation engine for one or more recommendation tokens from a database.

20. An apparatus of claim 11, wherein the apparatus is further caused to perform at least the following:

cause, at least in part, an output of three sets of tags, each of which are context specific tags, profile specific tags or a combination of context and profile tags, and cause, at least in part, embedding the type of tags that are output in a response to a query.

* * * * *